Patented July 20, 1937

2,087,263

UNITED STATES PATENT OFFICE 2,087,263

CELLULOSE PULPING SYSTEM AND PRODUCT THEREOF

Fredrich Olsen, East Alton, Ill., assignor to The Cellulose Research Corporation, a corporation of Delaware No Drawing. Application February 4, 1935, Serial No. 4,878

8 Claims. (Cl. 260—101)

This invention relates to the production of derivatives of cellulose, and particularly to cellulose nitrates, acetates, xanthates and the like.

The object of the invention is to provide cellulose derivatives of desirable strength, purity, viscosity and other essential characteristics.

A further object of the invention is to provide a process giving control of these characteristics in the final product and enabling derivatives of most desirable qualities to be produced from wood cellulose and the like.

Cellulose for conversion to such compounds as cellulose acetate, cellulose nitrate and cellulose xanthate, which is later regenerated to rayon or transparent film, must possess special qualities derived by precise purification processes. Numerous attempts have been made to utilize wood cellulose, but no commercial wood cellulose, even though of the highest available grade, yields esters equivalent to those produced, for instance, from available high grade purified cotton linters under present processes. The best grades of viscose rayon and transparent film are also made from cotton linters, and some varieties of regenerated cellulose, such as sausage casings, are not satisfactorily made from wood cellulose. This is emphasized in the case of cellulose for acetylation, and because of the greater difficulties encountered in purifying cellulose to a grade suitable for acetylation, such acetate material will be used to illustrate the results of this present invention, but it will be understood that the principles comprising the present invention are also applicable to other cellulose derivatives.

I have found that the suitability of cellulose for acetylation cannot be judged solely by result of analytical tests designed to measure the purity of the cellulose. Numerous samples of wood cellulose which when evaluated by currently accepted tests and other tests specially designed to indicate the degree of purity, have failed completely to produce satisfactory cellulose acetate by accepted procedures in the art. Certain other characteristics of the cellulose are necessary to the production of high grade acetate.

I have discovered that when cellulose is dried, by heat or by exposure to air, certain undesirable changes occur which are tentatively assumed to be associated with irreversible changes in the gel structure, rendering it relatively difficult, and in some instances impossible, subsequently to effect an intimate and uniform association of the required reagents with the cellulose. Assuming that the drying of the fibers below a certain point is accompanied by a shrinkage or setting of the gel structure, then this is apparently difficultly reversible or even irreversible, and imparts to the shrunken surfaces a hard, horny condition which tends to defeat any subsequent attempt to effect a homogeneous dispersion and permeation of the acetylating chemicals or other reagents throughout the mass. This would be especially true of the catalysts, such as sulphuric acid, which are usually employed in very small quantities. Even if protracted periods of pretreatment of such dried cellulose fibers with acetic acid and catalyst are employed, best results are not obtainable because excessive degradation of the cellulose is often encountered during this protracted treatment. Any condition of the fiber which prevents or even delays the immediate contact of the reagents with any and all parts of the cellulose has the inevitable effect of causing a non-uniform reaction, in which in the case of acetylation, there will be varying amounts of unacetylated or partially acetylated particles producing haze, color, or both, in the resulting product and undesirable effects in the production of other cellulose derivatives.

I have found that desired results in the chemical reaction on the cellulose can be attained by having water or other proper fluid intimately associated with the cellulose structure at the time of the addition of the reacting chemicals. For instance, in acetylation, I provide cellulose with a moisture content of fifty percent (50%), maintaining or restoring the natural permeable condition of the fibers and avoiding or counteracting the objectionable hardened gel condition, and when ready to proceed with the acetylation, this moisture is displaced almost entirely with glacial acetic acid so that the removal of the water held at the surface and in the pores and interstices of the fibers is simultaneously followed by the formation of films of acetic acid which retains the gel structure of the cellulose in the desirable state for effecting homogeneous dispersion of the catalyst and acetic anhydride, which has up to that time been maintained by the water. The dehydration by means of acetic acid may be effected in any convenient manner, for example by a dehydration press or by associating an excess, for example 100-600 parts of glacial acetic acid to 10 parts of cellulose, mixing the mass thoroughly and then pressing out to a liquid content of not less than thirty percent (30%) repeating the operation until the water content of the cellulose has been reduced to the desired degree.

After the final dehydration treatment a mixture of glacial acetic acid at 25° C. (sufficient to make the total weight of the cellulose and acetic acid present about eight times the oven dry weight of the original wood cellulose) and .036% or less of sulphuric acid are added to the sample with very thorough mixing in a short time, for instance, five minutes, and after addition of the catalyst and acetic acid 300% or less of acetic anhydride (which is also at a temperature of 25° C.) is thoroughly worked into the mixture in a short time, for instance five minutes. Upon completion of the mixing operation the vessel containing the mixture is tightly closed and heated to 40° C. and stirred until all of the grain has disappeared from the dope, which is usually about twenty to thirty minutes. Upon the disappearance of the last trace of grain the action of the acetic anhydride is stopped by the addition of 70% acetic acid. As an alternative procedure the catalyst may be added to the glacial acetic acid during the last stage of the dehydration of the wet cellulose.

The water present in the cellulose may be replaced by any fluid or liquid capable of maintaining the fibers in a permeable condition and which is a good solvent for the acetic anhydride or other reagent to be employed and which will not interfere with the intimate and uniform association of the reagent or reagents with the cellulose or hinder the desired reaction.

Many attempts have been made in the past to produce cellulose from wood capable of being satisfactorily acetylated, but these attempts have not succeeded, not necessarily because of the failure to attain a sufficiently high purity, but through the practice of drying the cellulose to low moisture content. This drying of the cellulose, besides being an added expense to the cost of manufacture, results in the above described shrinkage of the gel structure or other modifications of the cellulose, which so seriously impairs the subsequent penetration by the purifying reagents or by the acetylating reagents that the resulting dopes are characterized by a prohibitive amount of haze or color, or both, partly acetylated particles or a failure to acetylate at all.

In bringing the cellulose to the reaction in most favorable permeable and reactive condition, I have found it desirable never to permit drying of the fibers below the point of twenty percent (20%) moisture content, and preferably the moisture should be maintained at the fiber saturation point of thirty percent (30%) or above. In nature, moisture is used in forming the cellulose and keeping it in proper condition in the woody structure. By maintaining a moist condition of the fibers they are preserved in their natural state and are not subjected to unnatural drying with the resultant objectionable changes described above.

This moist condition may often be easily maintained in practice and not only entails little or no cost in the processing and purification, but may actually result in a reduction in expense.

In order to more particularly describe the present invention, there follows a description of a typical embodiment of the invention. It is to be understood that the various features set forth in connection with the embodiment of the succeeding example are by way of illustration only and are not intended to limit the scope of the present invention.

I may treat black gum wood, preferably selected to insure freedom from knots and decay, under conditions which insure uniformity of distribution of treating liquors with all portions of the woody structure before the attainment of reacting temperatures. Advantage may frequently be obtained by selecting only such wood as is essentially all sapwood, since the rate of delignification of sapwood and heartwood differs sufficiently to permit a greater uniformity of product being obtained if only sapwood is used. Furthermore, in the case of sapwood the cellulosic material has not had an opportunity to change and fibers capable of greater uniformity of treatment can be obtained. The natural sap content of the wood is maintained as nearly as possible by using freshly cut wood and maintaining the protecting bark on the logs until ready for flaking. The bark is then removed and the logs are thoroughly washed free of particles of bark and dirt and cut into flakes of approximately twenty to thirty thousandths of an inch in thickness. Water may be used at the flaking operation in order to protect the flakes from the drying action of the air. The flakes will thus retain the greater part of the natural moisture of the wood, which will in most cases be in excess of thirty percent (30%), and the flakes are stored in air tight containers until ready for charging into the digester so as to retain their moisture content.

The wood is then charged into the digester, which is preferably of the rotary type and constructed of chrome nickel steel of 20-10 alloy or its equivalent, equipped with means of injecting both steam and acid directly to the interior while either stationary or during rotation. The treating liquor consists of ammonium bisulfite of a composition comprising a total $SO_2$ content of 5.0% and a combined $SO_2$ content of 1.1%. The ratio of treating liquor to wood employed is 7.6 to 1. The liquor is heated to 90° C. in a separate acid accumulator tank and then pumped into the digester. Steam is then introduced into the digester with the vent line leading from the digester to the accumulator tank partly open and the heating continued until the liquor boils vigorously, which condition is maintained for fifteen minutes. The accumulator itself is vented, and assuming that the digester vessel is at thirty pounds, the accumulator pressure will be less, for instance ten pounds. Any escape of steam or $SO_2$ vapors from the digester will enter the accumulator near the bottom of the liquid and will serve to somewhat heat up the liquid in the accumulator. This will, of course, increase the pressure in the accumulator, but if the accumulator valve is set, for example at about ten pounds, air can continuously escape from this open valve and boiling will proceed in the digester because of the differential of pressure between the two vessels, one at thirty pounds and the other at ten. The vent line to the accumulator is then closed, the rotation of the digester is started and steaming continued as rapidly as possible until the temperature within the digester reaches 135° C., which will require about three quarters of an hour. The temperature is held at 135° C. for seven hours, when the cooking is terminated and the used liquor in the digester drawn off and hot water, preferably at above 100° C. is injected until the digester is approximately two thirds filled, after which it is rotated for five minutes as a means of washing the pulp, after which the water is drawn off into the sewer and the washing operation repeated twice. During the draining and washing, steam is maintained in the digester so that air is excluded from it and the washing is done substantially in the absence of air.

The contents of the digester is then discharged into a dump tank equipped with agitation where it is subjected to further washing until neutral to litmus and to violent agitation to break down any bundles of fibers which it may contain.

The pulp is now ready for purification and is first treated for five minutes at a three percent (3%) consistency with the equivalent of fifteen percent (15%) bleaching powder in the form of chlorine water solution at 20° C. The mass of pulp is then promptly transferred to a continuous filtering device or a centrifuge and washed thoroughly with purified water until neutral to litmus, after which it is boiled at a three percent (3%) consistency with one percent (1%) concentration of caustic soda for thirty minutes. The treating liquor is then drawn into a storage tank and the pulp washed free of alkali. The chlorination, caustic boiling and washings are repeated and the pulp is again chlorinated and washed. The concentration of chlorine in the second and third chlorinations, however, is reduced to one percent (1%). The concentration of the alkali may be increased especially after the second chlorination to permit the removal of polysaccharides of low state of polymerization.

After the third chlorination the pulp is immersed and agitated in a 13 to 18% caustic soda solution at 25° C. for ten minutes, then run into a settling tank for the purpose of draining the strong caustic solution from the pulp. After the caustic solution is drained from the pulp and run to the storage tank, the caustic soda retained by the pulp is diluted until the concentration is reduced to one percent (1%) and the mass boiled for thirty minutes. After the boiling the pulp is again mercerized with the same concentration of caustic soda for the same time and temperature, and after thorough washing with purified water, given a final one half percent (½%) chlorination for five minutes, then washed until neutral to litmus. When higher viscosity pulp is desired the alkali boiling after the first mercerization is omitted. The final chlorination or bleaching may also be carried out between the two mercerizations.

All of the preceding processing and treatments are preferably carried out under conditions in which atmospheric oxygen is excluded and under which the chlorine water solution or alkaline solution content of the pulp is never less than fifty percent (50%), and upon the completion of the purification the pulp will have an alpha cellulose content in excess of ninety-nine percent (99%), a soda soluble content of less than three percent (3%), an ash content of less than ten hundredths percent (0.10%), will be lignin free and will contain from fifty percent (50%) to seventy percent (70%) water, and, upon displacing the water in the cellulose with acetic acid will have characteristics and condition admirably qualifying it for conversion into acetates of low color and haze and other desirable qualities or into other derivatives of superior qualities.

While this process has been specifically illustrated in connection with acetylation of cellulose, it is not confined thereto but is applicable to any chemical treatment of the cellulose where there is to be desired complete response to the action of the reagent. It is of critical importance to have the cellulose in proper condition for reaction and not to require the reaction itself to recondition it. Where the fibers are open and permeable as in the process of this invention, all polymers of the cellulose are homogeneously available for prompt association with the active ingredients of the reagent. This is a most natural condition for reaction with the cellulose. In the growing tree the cellulose is intimately associated with water molecules, which are held to its surface and in its pores by secondary valence forces. This is, in effect, a film of water through which any water soluble substance may diffuse, ionize, and follow any of the general laws of solutions.

Thus, in the process of this invention as illustrated in the dehydration of the cellulose with acetic acid, any removal of this water film that occurs is simultaneously followed by the formation of an acetic acid film, which in turn is a good solvent for the acetic anhydride and catalyst and the acetylation can take place without hindrance. Similarly, other liquids may be used in place of the acetic acid to replace the water.

Although high purity is a necessary requirement of cellulose for acetylation, nevertheless it is not a sufficient criterion for acceptability when high quality cellulose acetate is required. The chemical purity of pulp samples is usually described by a set of indices derived from chemical and physical tests generally empirical in nature. Numerous samples of commercial and special wood celluloses have been examined by the analytical methods generally accepted as a guide to the desired characteristics. The chemical constants of these celluloses are shown in the following table:

|  | Commercial B | Commercial A | Special |
| --- | --- | --- | --- |
|  | Percent | Percent | Percent |
| 1. Alpha cellulose | 90 | 96 | 99.5 |
| 2. Soluble in 7.14% caustic soda | 15 | 6 | 1.0 |
| 3. Ash | 0.5 | 0.1 | .05 |
| 4. Pentosan | 7-15 | 1.5 | 1.0 |
| 5. Lignin | 0.5 | 0.05 | 0.0 |

When these dried commercial samples of wood cellulose A and B (or even purified cotton linters) are acetylated by the process described in this application, they will result in acetate dopes having haze and/or color greatly in excess of two hundred parts per million, and in many cases portions of the fibers will remain in an incompletely acetylated state. Even pulp designated as "Special" (which has been prepared as described in this application) when dried and then acetylated in the above mentioned manner, will result in an incompletely acetylated acetate dope of high color and haze. It has also been found that even if normal methods of reconditioning these dried fibers are employed, they still do not result in satisfactory acetate dopes upon acetylation by the method described herein. In addition it has been found that when these dried commercial samples A and B and the "Special" pulp (which has been dried) are acetylated by a method which gives satisfactory results with dry cotton linters (2-5% moisture) they will again result in acetate dopes of high color and haze.

These results are so unsatisfactory that wood celluloses are not employed at this time in the preparation of high grade acetate films or yarn.

With the process of this invention, however, the action of the reagent is made uniform and in the product the impurities and objectionable characteristics are reduced or avoided altogether. With cellulose acetate from wood cellulose, for instance, the acetyl content and viscosity are fully satisfactory and controllable, while the color and haze are reduced and may be kept below 100 P. P. M. in each case or even below 40 P. P. M.

The measurements referred to herein of the color and haze of the acetate dope were made by comparisons with standards of known color and turbidity expressed in parts per million. The standards are those used for water analysis, recommended by the American Public Health Association and consist of platinum cobalt (for color determinations) and fuller's earth (for turbidity comparisons). From the material recommended by the American Public Health Association, a series of standard solutions ranging from 10 P. P. M. to 200 P. P. M. inclusive at intervals of 10 P. P. M. were prepared for both color and haze. 100 cc. of each of these solutions was hermetically sealed in an 8 ounce, wide mouth, glass stoppered bottle having an internal diameter of $2\frac{1}{16}''$. The acetate dope samples to be measured were prepared in the same size (8 ounce, wide mouth, glass stoppered bottles) and compared under a controlled source of light, first with the color standards and then with the haze standards until the particular solution of each which most nearly corresponded to the dope under comparison was found. The measurement of the color and turbidity of the acetate dope is made exactly one hour after the dope has been killed by the addition of acetic acid and at the time of measurement the dope must be absolutely free from air bubbles and at a temperature of 25° C. and the quantity of dope under comparison in the bottle must not be less than 100 cc. It has been found that color and haze ratings by this method can be made to an accuracy of approximately ±10 P. P. M.

I claim:

1. The process of treating cellulose comprising supplying woody material containing cellulose fibers having a natural moisture content in excess of 20%, treating said material to remove noncellulosic constituents and separating said fibers as a pulp while always maintaining said cellulose associated with at least 20% of a wetting medium preserving the cellulose penetrable and permeable so that said cellulose is never permitted to fall below 20% content of a wetting medium, and reacting said saturated cellulose to form a chemical compound with a reagent.

2. The process of treating cellulose comprising supplying woody material containing cellulose fibers having a natural moisture content in excess of 20%, treating said material to remove non-cellulosic constituents and separating said fibers as a pulp while always maintaining said cellulose associated with at least 20% of a wetting medium preserving the cellulose penetrable and permeable so that said cellulose is never permitted to fall below 20% content of a wetting medium, and reacting said saturated cellulose to form a cellulose ester.

3. The process of treating cellulose comprising supplying woody material containing cellulose fibers which have never been dried to the extent of shrinking the cellulose, treating said material to remove noncellulosic constituents while maintaining the moisture content of the fibers in excess of 20% so that said cellulose is never permitted to fall below 20% content of a wetting medium, and displacing the water in the purified cellulose with acetic acid with substantially no shrinkage of the cellulose.

4. The process of treating cellulose comprising supplying woody material containing cellulose fibers which have never been dried to the extent of shrinking the cellulose, treating said material to remove noncellulosic constituents while maintaining the moisture content of the fibers in excess of 30% so that said cellulose is never permitted to fall below 30% content of a wetting medium, and displacing the water in the purified cellulose with acetic acid with substantially no shrinkage of the cellulose.

5. As a new product cellulose impregnated with an organic liquid obtainable according to the process as claimed in claim 1.

6. As a new product cellulose impregnated with an organic liquid obtainable according to the process as claimed in claim 2.

7. As a new product cellulose impregnated with acetic acid obtainable according to the process as claimed in claim 3 and capable of conversion by the use of less than 3.0 parts of acetic anydride to one part of cellulose by weight to a cellulose acetate of suitable properties for use in films, sheeting, yarn, plastics and other articles of manufacture.

8. As a new product cellulose impregnated with acetic acid obtainable according to the process as claimed in claim 4 and having an alpha cellulose content of more than 96% and a soda soluble content of less than 6% and capable of conversion by the use of 3.0 parts of acetic anhydride to one part of cellulose by weight to a cellulose acetate of suitable properties for use in films, sheeting, yarn, plastics and other articles of manufacture.

FREDRICH OLSEN.